S. L. GOODIN.
CHECK ROW PLANTER.
APPLICATION FILED FEB. 11, 1916.

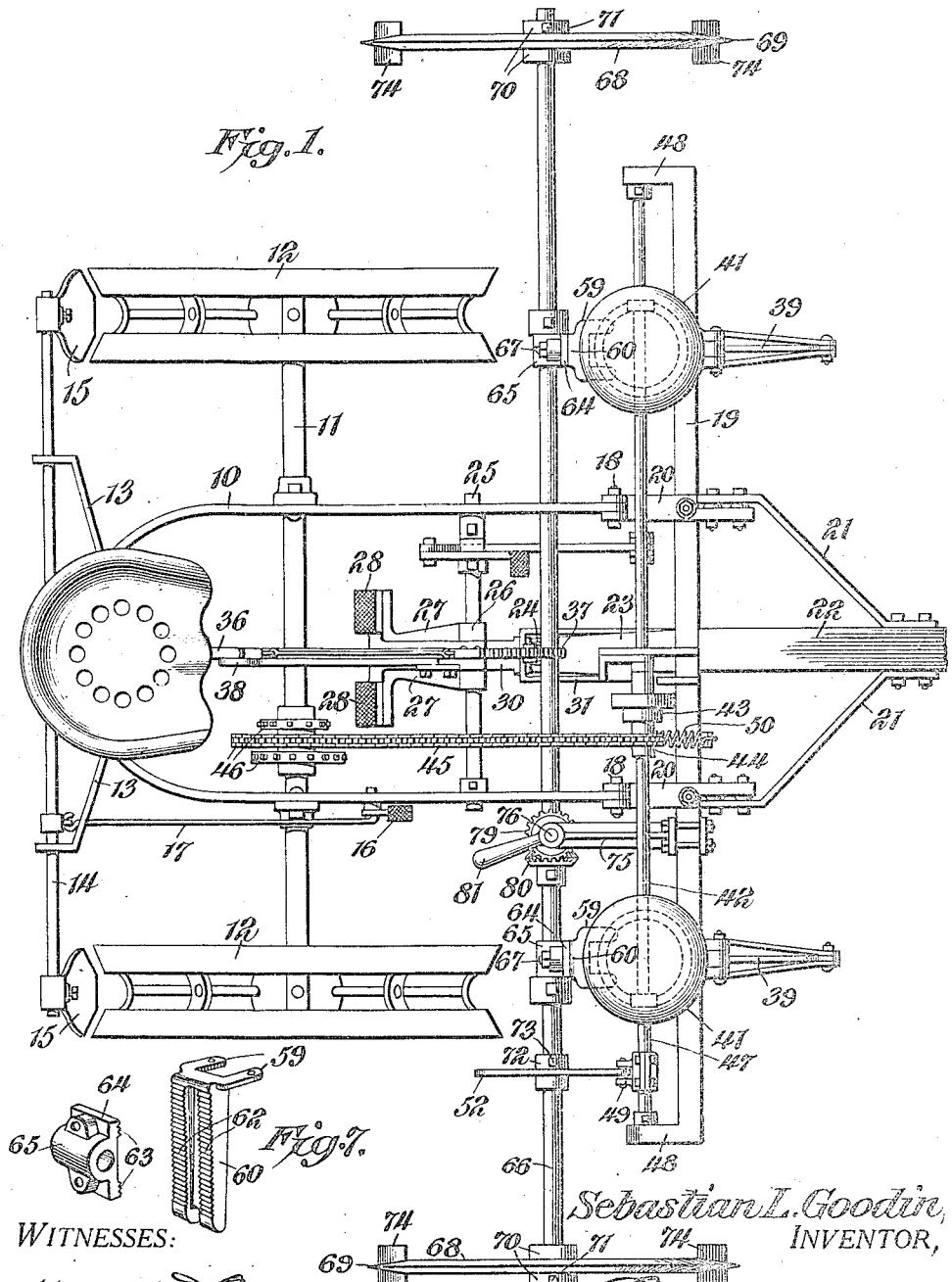

1,229,941.

Patented June 12, 1917.
2 SHEETS—SHEET 2.

Sebastian L. Goodin,
INVENTOR,

WITNESSES:

BY

Attorney

UNITED STATES PATENT OFFICE.

SEBASTIAN L. GOODIN, OF FARBER, MISSOURI, ASSIGNOR OF ONE-HALF TO AUGUST F. TUEPKER, OF FARBER, MISSOURI.

CHECK-ROW PLANTER.

1,229,941.      Specification of Letters Patent.      Patented June 12, 1917.

Application filed February 11, 1916. Serial No. 77,752.

*To all whom it may concern:*

Be it known that I, SEBASTIAN L. GOODIN, a citizen of the United States, residing at Farber, in the county of Audrain and State of Missouri, have invented a new and useful Check-Row Planter, of which the following is a specification.

This invention relates to an improvement in wireless check row devices, adapted for application to planters, drills, and the like, and designed for the purpose of eliminating the necessity of using the usual check wire, which is now commonly employed, and which requires considerable time and skill in placing and removing the wire at frequent intervals.

The present invention has for an object to provide a check row device wherein marker wheels are employed for engagement in the ground to rotate therein, and are provided with markers to indent the ground surface, and designate the points at which the seeds are dropped from the implement.

It is another object of this invention to provide markers which are adjustably fixed upon a shaft independent of the main shaft of the implement, and to mount on the implement an adjusting mechanism for connection with the marker shaft, so as to rotate the same, and turn the two markers thereon in the desired adjusted position at the end of a row, and to admit of this adjustment without disturbing the relation of the parts of the implement.

A further object of the invention is to provide markers which are so spaced apart that the distance between them is substantially twice the distance between the main wheels of the implement, so that when the implement is turned at the end of a row, the marks in the ground, produced by the markers, may be taken as guides for setting the markers in the return of the machine, so that the proper registration of the seed dropping is insured.

The invention still further aims at the provision of means for mounting the marker shaft adjustably upon the runner frame of a corn planter, so that the markers may be raised and lowered with respect to the runners, and so that when the runners are elevated or lowered during the use of the machine, the markers are simultaneously raised and lowered, and held in their adjusted position with respect to the runners. By this peculiar mounting of the marker shaft, the usual handle and other operating means which control the runners will also control the position of the markers, when they are adjusted to the runner frame. This feature of the invention also embodies the positioning of the marker shaft in vertical alinement over the discharge end of the boot, so that the markers may be accurately adjusted to indicate when the seed is dropped.

Other objects and advantages of this invention will appear from the following disclosure of the present preferred embodiment of the invention, which is illustrated in the accompanying drawings, in which—

Figure 1 is a top plan view of a corn planter having the improved wireless check row device mounted thereon.

Fig. 2 is a side elevation of the same.

Fig. 3 is a detail rear elevational view of the runner frame, showing the seed plate shaft, and the check shaft, mounted thereon, and showing in section the marker shaft and the improved bearings or supports therefor.

Fig. 4 is a detail plan view of the check shaft, showing a portion of the marker shaft and the tappet carried thereby.

Fig. 5 is a detail side elevational view, partly in section, of one of the boots, showing the mounting of the marker shaft directly over the discharge end of the boot.

Fig. 6 is a detail view of the adjusting handle and mechanism for adjusting the markers.

Fig. 7 is a detail perspective view of the mounting for the marker shaft, which is carried upon the rear end of each boot.

Referring to the drawings, wherein like parts are designated by similar numerals of reference throughout the several views, 10 designates the frame of a standard corn planter, provided with the usual drive axle 11, upon the outer ends of which are mounted the wheels 12. The rear end of the frame 10 has a pair of oppositely extending brackets 13 in which is mounted a transverse scraper shaft 14, having scrapers 15 upon its ends adapted to bear against the wheels 12, when actuated by the foot lever 16, which is carried at one side of the frame 10. The foot lever 16 is connected by rod 17 in the usual manner to the scraper shaft 14, as shown. The frame 10 constitutes the main frame, and at its forward end is hinged by pins 18 to the runner frame. The runner frame comprises a transverse bar 19 provided with spaced apart rearwardly extending arms 20 secured by the pins 18 to the driving frame, and having their forward ends connected adjustably to the braces 21, which support therebetween the tongue 22. The tongue 22 extends to the cross bar 19, and is provided at its under side with a rearwardly extending arm 23 to the rear end of which is secured the lower end of a compression spring 24. The main frame 10 is provided forwardly of the drive axle 11 with a transverse rod 25, upon which is hingedly mounted an operating lever 26. This operating lever comprises a casting having a pair of rearwardly extending arms 27 terminating in outwardly turned tread portions 28 to serve as a foot rest and assist in swinging the operating lever 26. The forward end of the casting of this operating lever has a lug 29 to which is secured the upper end of the compression spring 24. Thus, the rear end of the tongue 22 is connected to the operating lever. The arms 27 have secured adjustably therebetween the rear end of a compensating link 30 hingedly secured at its end to a connecting rod 31, which extends forwardly beneath the operating lever to a point beneath the rear end of the tongue 22, and is hinged thereat to the lower end of a hanger 32 depending from the arm 23. An equalizing spring 33 is secured at its rear end to said hanger and at its forward end to a lug 34 projecting downwardly from the tongue 22. This equalizing spring may be adjusted by means of the threaded bolt 35 connecting the forward end of the spring 33 to the lug 34. It is thus seen that the runner frame is hinged to the main frame, that the compression spring 24 resists the upward movement of the frames, and that the equalizing spring 33 resists the downward movement.

When the operating lever 38 is adjusted, the springs yieldingly hold the frames in the desired position. A seat post 36 rises from the transverse rod 25 between the arms 27 of the operating lever. The seat post has a forwardly extending rack or segment 37 to secure the handle 38 in position when the operating lever is adjusted.

The runner frame, which may be designated as a whole as 19, has near its opposite ends the depending runners 39 at the rear ends of which are located the vertically arranged boots 40. It will be noted that the boots 40 incline rearwardly at a slight angle and this usual construction is taken advantage of, as will be hereinafter set forth. The usual seed cans 41 are mounted on top of the boots and provided with the usual seed selecting and dropping mechanism. The mechanisms of each boot are joined by an upper transverse seed plate shaft 42 adapted to rotate the seed plates in the usual manner, the shaft being driven through a variable drop clutch 43, the rotating part of which is driven by a sprocket 44 receiving the drive chain 45 thereover, which chain may be placed on any one of a number of change speed sprockets 46 keyed to the drive shaft 11.

The runner frame is also provided with a check shaft 47 extending transversely thereacross beneath the seed plate shaft 42, the check shaft 47 being suitably journaled in rearwardly extending arms 48 carried upon the outer extremities of the bar 19. A finger 49 is mounted for adjustment about the shaft 47 at one end thereof, preferably the right hand end, as shown in Fig. 1. An adjustable check spring 50 is mounted on the bar 19, extends rearwardly and engages a lug 51 upstanding from the check shaft 47 adjacent the intermediate portion thereof. Thus, the check shaft 47 is held in one position by the spring 50 and is adapted to be rocked against the tension of the spring by engagement of a tappet 52 against the finger 49 at certain predetermined intervals.

As shown in Fig. 5, the check shaft 47 passes at each end through the boot 40 and has a rearwardly extending lug 53 fitting in a notch 54 formed upon the inner edge of a valve 55. The valve 55 is hinged in the boot and adapted to close the upper end thereof. The valve 55 is connected by the usual rod 56 to the lower valve 57, so as to alternately open and close the upper and lower valves 55 and 57, and thus control the dropping of the seed. The upper end of the boot is provided with the outstanding webs 58 in the usual manner, and engaging beneath these webs 58 are the attaching lugs 59 of a depending support 60. The lugs 59 are spaced apart for engagement against the opposite sides of the boot and against the lower faces of the opposite webs 58. The boot attaching bolts 61 being employed for securing the support 60 in place. As shown to advantage in Fig. 7, the support 60 comprises a pair of spaced apart bars of preferably angle cross section, and having in their outer faces transverse registering serrations or teeth 62 adapted to interfit with the transverse serrations or teeth 63 formed on the inner face of the base flange 64 of a bearing 65. This bearing 65 extends transversely across the rear edge of the boot 40. Each boot 40 has a bearing 65, and the bearings are adapted for adjustment into transverse alinement to support therein the marker shaft 66. The flange 64 of the bearing 65 is secured to the support 60 by clamping bolts 67 which pass inwardly through the ends of the flange 65 and through a vertical slot formed in the support 60. The bolts are adapted to bind against the inner transverse flanges of the bars and thus hold the bearing 65 rigidly to the support. By loosening the bolts 67, it is readily seen that the base flanges 64 of the bearings may be moved outwardly from the supports 60 to disengage the teeth 62 and 63, and to thus admit of the raising or lowering of the bearings into a new position. It will also be noted that by this mounting of the marker shaft 66, the same is carried upon the runner frame and is movable therewith into all the various adjusted positions of which the runner frame is capable, and which are imparted to the runner frame by the adjustment of the operating lever 26. It will also be noted that the marker shaft may be raised or lowered with respect to the runner frame, so that the relative positions of the marker shaft and the runner frame may be varied, and fixed in their relatively adjusted positions. Also, the marker shaft and the runner frame are connected so that when the same are fixed together, they move as a unit into various positions without destroying their relative adjustment.

The marker shaft 66 is provided upon its opposite ends with marker wheels or disks 68, which may be of open wheel construction, as shown in the drawings, or may be of any other desired form. In all forms, however, it is desirable to provide a peripheral cutting edge 69 on each of the marker wheels or disks, so that the same may penetrate the ground, and so that the earth, and other accumulations, will not adhere and be picked up by the marker wheels in their rotation. These marker wheels have hub sleeves 70, engaging over the opposite ends of the marker shaft 66, and which are adapted to be fixed upon the marker shaft by set screws 71, or the like, so that the marker wheels may be adjusted toward and from each other according to the desired use of the machine. The marker shaft 66 is adapted to be of such length that when the marker wheels 68 are secured upon the opposite outer ends of the shaft, the marker wheels will be spaced apart a distance equal to twice the distance between the frame wheels 12. The advantage of this arrangement is that after the planter has passed over a row, the planter may be turned around and one of the marker wheels be adjusted to register exactly with the surface indentations made in the first row to thus insure the proper registration in the dropping of the seeds in the second row, and other consecutive rows. It is thus seen that one row of marks is a check upon the second row, so that by this method the dropping of the seed is uniform over the entire field.

The marker shaft 66 carries near its right hand end, the tappet 52. The tappet is in the form of a double arm, the ends of which extend diametrically opposite from a hub 72 fixed by a set screw 73 to the marker shaft 66. The marker wheels 68 are each provided with a pair of diametrically opposed markers 74. The wheels and the tappet arm 52 are so adjusted that when a marker 74 engages the ground, one end of the tappet arm 52 strikes the finger 49 and rocks the check shaft 47 to actuate the valves 55 and 57, and thus deposit the predetermined quantity of seed in the ground immediately beneath the marker shaft 66. In disposing the marker shaft 66 immediately above the outlet end of the boot 40, as shown in Fig. 5, the marker 74 is in direct transverse registration with the seed dropped and thus indicates clearly each dropping of the seed, and also admits of the relative easy adjustment of the marker wheels 68.

The transverse bar 19 of the runner frame has adjustably secured thereto, a rearwardly extending bracket arm 75. This bracket arm 75 has journaled in its rear end, a vertically extending shaft 76, provided with a collar 77 adjustable on the shaft and beneath which is placed a coiled spring 78 surrounding the shaft and bearing at its lower end against the upper edge of the arm 75 to thus yieldingly hold the shaft 76 in raised position. The lower end of the shaft carries a beveled gear 79 fixed to the shaft to turn therewith and adapted for engagement at its upper flat face against the lower edge of the arm 75 to limit the upward movement of the shaft. The marker shaft 66 has a beveled gear 80 fixed thereon, as shown in Fig. 6, and which is of such size that it remains normally out of mesh with the beveled gear 79, when the latter is raised by the spring 78. A handle 81 is carried upon the upper end of the shaft a convenient height to be grasped for the purpose of forcing the shaft 76 downwardly through the arm 75 and against the tension of the spring 78, to lower the beveled gear 79 into inter-meshing relation with the beveled gear 80, and thus admit of the rotation of the marker shaft 66 when the handle 81 is turned. By this means, the marker shaft 66 with its marker wheels 68 may be turned into any desired position to correctly place the markers 74.

It is, of course, understood that the improvements of the wireless check row device above set forth may be applied to any type of machine, and to other machines than planters, wherein a check rower is required. It will also be understood that various changes and modifications may be made in the improvement to adapt the same to the various uses for which it is designed, such changes or modifications being restricted only by the scope of the following claims.

What is claimed is:—

1. The combination with a planter having a main frame, a runner frame having boots and hinged to the main frame, and an adjusting lever connecting the two frames, of a marker shaft in vertical alinement with the delivery end of said boots and adjustably fixed on the runner frame for adjustment relatively thereto and adapted for simultaneous adjustment therewith with respect to the main frame, markers on the ends of said shaft, and a tappet carried by the shaft for actuating the check shaft of the runner frame.

2. The combination with a planter having a main frame, a runner frame, and a lever on the main frame for adjusting the runner frame, of a marker shaft, marker wheels mounted on the shaft and having markers thereon, a tappet on the marker shaft for engagement with the check shaft of the runner frame, a fixedly adjustable mounting for the marker shaft carried by the runner frame to admit of the adjustment of the marker shaft upon the runner frame to various fixed positions thereon, a handle carried by the runner frame for interlocking engagement at times with the marker shaft to rotate the same into adjusted position independently of the main frame, said lever on the main frame being adapted to be operated to simultaneously adjust the runner frame and the marker shaft whereby to raise the runners and the marker wheels simultaneously out of the ground.

3. The combination with a planter having a runner frame and a main frame, of a marker shaft mounted upon the runner frame in vertical alinement with the delivery ends of the boots carried by the runner frame, marker wheels mounted on the marker shaft and having markers thereon adapted to engage the ground in transverse alinement with the delivery ends of said boots, normally disengaged means for turning said marker shaft to adjust the markers into the desired position independently of the supporting wheels of the main frame, a handle on the main frame for adjusting the runner frame and the marker shaft, and means for fixedly adjusting the marker shaft relatively to the runner frame.

4. The combination with a planter, of a pair of depending supports carried by said planter and having serrations in their rear faces, bearing blocks having base flanges provided with transverse serrations in their inner faces for engagement against said supports and intermeshing with the serrations thereon, clamping bolts adapted to bind said blocks in adjusted positions upon the supports, and a marker shaft journaled in said blocks and provided with marker wheels and adapted to be raised and lowered with respect to the ground upon the adjustment of said blocks.

5. The combination with a planter having a main frame, a runner frame, a check shaft on the runner frame, and a finger outstanding from the check shaft, of a marker shaft mounted transversely on the planter, marker wheels upon the opposite ends of said marker shaft, a tappet adjustable on said marker shaft for engagement with said finger to rock the check shaft, and markers on said marker wheels, the marker wheels and the tappet being independently adjustable on the shaft whereby to adjust the tappet relative to the markers to trip the check shaft when a marker of each wheel is in a predetermined position.

6. The combination with a planter having a main frame, a runner frame adjustable relatively to said main frame, a check shaft on the runner frame, a marker shaft mounted transversely of the runner frame, adjustable vertically thereof into various fixed positions relatively thereto and immovably attached to said runner frame when in any adjusted position, and marker wheels upon the opposite ends of the marker shaft, of boots having their delivery ends in vertical alinement with said transversely extending marker shaft and controlled by said check shaft, a tappet adjustably mounted on said marker shaft for actuating the check shaft, and markers on the marker wheels, the tappet being adjustable to cause the seed to drop at points in transverse alinement with the marks as formed or between said marks.

7. The combination with a planter having a main frame with supporting wheels, a runner frame adjustably mounted relatively to said main frame, boots mounted upon said runner frame, a marker shaft fixedly adjustable on said runner frame to various positions in vertical alinement with the discharge openings of said boots, marker wheels fixed to said marker shaft, and means for rotating said marker shaft to adjust the wheels and adapted to engage said marker shaft to rotate the same irrespective of the position to which the shaft has been adjusted.

In testimony, that I claim the foregoing as my own I have hereto affixed my signature in the presence of two witnesses.

SEBASTIAN L. GOODIN.

Witnesses:
 H. E. GOODIN,
 C. W. MAY.